L. G. MORRIS.
PROJECTION APPARATUS.
APPLICATION FILED FEB. 16, 1916.
1,216,835.
Patented Feb. 20, 1917.
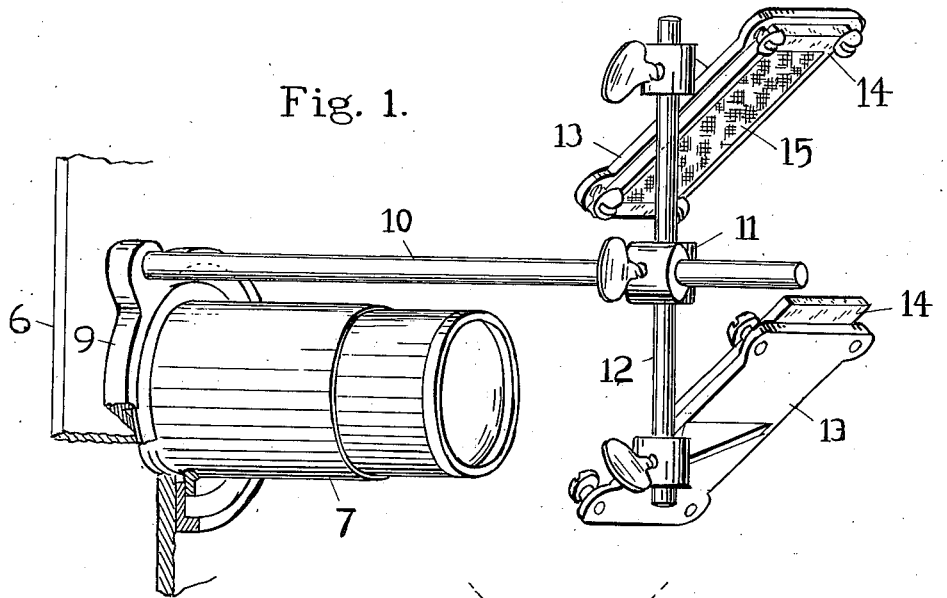
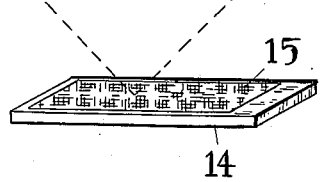
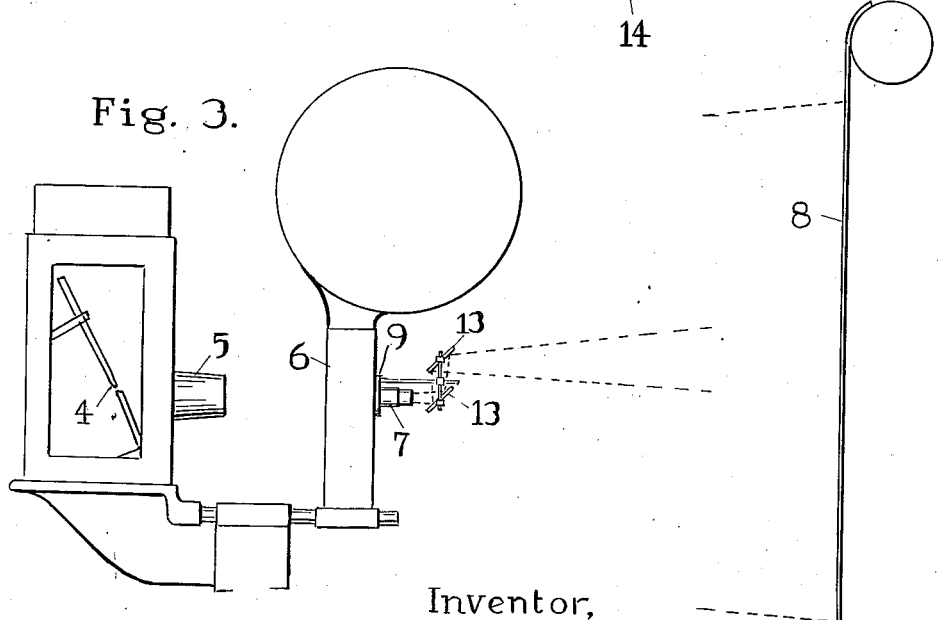
Inventor,
Lewis G. Morris,
by Samuel W. Balch
Attorney.

UNITED STATES PATENT OFFICE.

LEWIS G. MORRIS, OF NEWPORT, RHODE ISLAND.

PROJECTION APPARATUS.

1,216,835.

Specification of Letters Patent.

Patented Feb. 20, 1917.

Application filed February 16, 1916. Serial No. 78,592.

*To all whom it may concern:*

Be it known that I, LEWIS G. MORRIS, a citizen of the United States of America, and resident of Newport, in the county of Newport and State of Rhode Island, have invented certain new and useful Improvements in Projection Apparatus, of which the following is a specification.

This invention relates to the production of magic-lantern and motion pictures on screens. The intense and concentrated light of the electric arc is usually resorted to for the projection of slides and motion pictures to secure sufficiency of illumination and distinctness of image, but the presence of rays of short wave length in considerable amount renders such light very trying to the eyes, and to modify it, it has heretofore been customary, either to project the rays through lantern slides or motion-picture films which have been treated with coloring matter of a semi-transparent nature, or by passing the rays through such coloring matter carried separately from the slides or film, or by projecting the image on a screen which carries substances on its surface that will absorb the undesirable rays. The first two methods have been found objectionable because of undue absorption also of the desirable rays, and the last has been found to entail a great expense owing to the extent of surface to be covered with costly reflecting substances which are properly selective. Furthermore such substances have not permanent qualities.

This invention aims to avoid these difficulties and has for its object the projection of pictures in golden mellow tones of adequate intensity and by comparatively inexpensive means and under the direct control of the operator.

In the accompanying sheet of drawings which forms a part of this application—

Figure 1 is a perspective of an attachment with mirrors embodying my invention in connection with the projection lens of a motion-picture machine.

Fig. 2 is a perspective of a mirror.

Fig. 3 is an elevation of the motion-picture apparatus with the attachment.

The motion-picture apparatus comprises the usual source of light 4, as shown, condensing lens combination 5, film-feeding mechanism 6, projection lens combination 7, and screen 8. To this is added a mirror holder comprising a ring 9 which is clamped and held in place by the flange of the projection lens when screwed into place in the machine. Rigidly connected to the edge of the ring and extending parallel to the axis is a rod 10. Secured to this rod by a clamp 11 with holes at right angles is a cross rod 12, and to the cross rod at angles of forty-five degrees and parallel to each other are mirror-supporting plates 13, 13. The mirrors comprise ground and polished glass supports 14, 14 and metallic reflecting deposits 15, 15, the metal of one or both being of a suitable color selective metal as gold or copper which may be alloyed more or less with other metals as silver so as to give a golden mellow tone to the reflected rays. The metal is preferably electrically deposited on the glass and to an opaque depth. The mirrors are surface mirrors, that is to say, they are so placed in the holders and in the path of the light beam that reflection will take place directly from the surfaces of the metallic deposits, and the rays will not have to pass through the glass supports and become confused with partial reflections from the glass surfaces, and the color selective properties of the metals will be utilized.

It is immaterial where along the beam of light the mirrors are located, except that it is desirable to have them at or near the projection machine where the beam is small in order that the mirrors may be small to reduce their cost and have them within reach of the operator. Neither is it essential that there should be two mirrors, but with two parallel mirrors the beam is returned to its original direction so that projection can be made both with and without the mirrors with the machine in the same position.

It will be obvious that with this apparatus all the rays which would otherwise appear white to the eye, will by reason of the reflection from the color selective metallic mirror be colored a golden mellow tone, while rays of pure colors may not be changed.

What I claim as new, and desire to secure by Letters Patent of the United States, is—

1. The combination of a source of light, and an image projection apparatus including an opaque color selective metallic mirror interposed in the path of all of the light passing through the projection apparatus, whereby a golden mellow tone is imparted to all of the light which would otherwise appear white in the projected image, substantially as described.

2. The combination of a source of light, and an image projection apparatus including a pair of adjacent opaque parallel color selective metallic surface mirrors interposed in the path of all of the light passing through the projection apparatus, whereby a golden mellow tone is imparted to all of the light which would otherwise appear white in the projected image, substantially as described.

3. The combination of a source of light, an image projection apparatus, and an opaque color selective metallic surface mirror directly in front of the projection apparatus in the path of all of the beam from the projection apparatus, whereby a golden mellow tone is imparted to all of the light which would otherwise appear white in the projected image, substantially as described.

4. The combination of a source of light, an image projection apparatus, and a pair of adjacent opaque parallel color selective metallic surface mirrors directly in front of the projection apparatus in the path of all of the beam from the projection apparatus, whereby a golden mellow tone is imparted to all of the light which would otherwise appear white in the projected image, substantially as described.

5. The combination of a source of light, an image projection apparatus, a mirror holder comprising a ring adapted to be clamped to the apparatus by the flange of the projection lens and carrying a rod parallel with the axis of the ring, mirror supporting plates carried by the rod, and mirrors carried by the plates one of which is an opaque color selective metallic surface mirror interposed in the path of all of the light passing through the projection apparatus, whereby a golden mellow tone is imparted to all of the light which would otherwise appear white in the projected image, substantially as described.

Signed by me at New York, borough of Manhattan, N. Y., this 15th day of February, 1916.

LEWIS G. MORRIS.

Witnesses:
SAMUEL W. BALCH,
HUGH H. SENIOR.